(12) United States Patent
Erving

(10) Patent No.: US 6,909,755 B2
(45) Date of Patent: Jun. 21, 2005

(54) METHOD AND SYSTEM FOR INCREASING DATA THROUGHPUT IN COMMUNICATIONS CHANNELS ON AN OPPORTUNISTIC BASIS

(75) Inventor: Richard H. Erving, Piscataway, NJ (US)

(73) Assignee: AT&T Corp., New York, NY (US)

( * ) Notice: Subject to any disclaimer, the term of this patent is extended or adjusted under 35 U.S.C. 154(b) by 886 days.

(21) Appl. No.: 09/818,190

(22) Filed: Mar. 27, 2001

(65) Prior Publication Data

US 2002/0172212 A1 Nov. 21, 2002

(51) Int. Cl.$^7$ ............................. H04L 23/02; H04L 5/12
(52) U.S. Cl. ..................... 375/264; 375/261; 375/219; 375/221; 375/222; 375/298; 375/279; 375/308; 455/102
(58) Field of Search ................................ 375/260–261, 375/264–265, 219, 221–223, 279, 295, 298, 308; 455/102, 435.2; 370/345, 204, 497, 535

(56) References Cited

U.S. PATENT DOCUMENTS

| | | | |
|---|---|---|---|
| 4,891,806 A | * | 1/1990 | Farias et al. ................. 370/503 |
| 5,241,544 A | | 8/1993 | Jasper et al. |
| 5,394,440 A | | 2/1995 | Goldstein et al. |
| 5,548,253 A | | 8/1996 | Durrant |
| 5,559,810 A | * | 9/1996 | Gilbert et al. ............... 714/704 |
| 5,612,651 A | * | 3/1997 | Chethik ....................... 332/103 |
| 5,655,003 A | * | 8/1997 | Erving et al. ................ 379/418 |
| 5,881,109 A | | 3/1999 | Kim et al. |
| 5,949,799 A | | 9/1999 | Grivna et al. |
| 5,978,650 A | | 11/1999 | Fischer et al. |
| 5,987,068 A | | 11/1999 | Cassia et al. |
| 6,041,074 A | | 3/2000 | Nakamura |
| 6,055,266 A | | 4/2000 | Nakamura |
| 6,061,408 A | | 5/2000 | Achour |
| 6,167,031 A | * | 12/2000 | Olofsson et al. ............. 370/252 |
| 6,298,092 B1 | * | 10/2001 | Heath et al. ................. 375/267 |
| 6,760,882 B1 | * | 7/2004 | Gesbert et al. .............. 714/774 |
| 2002/0009157 A1 | * | 1/2002 | Sipola ......................... 375/295 |

* cited by examiner

Primary Examiner—Phuong Phu
(74) Attorney, Agent, or Firm—Banner & Witcoff, Ltd.

(57) ABSTRACT

A method is presented for increasing data throughput in a communications channel comprising the steps of selecting a first data packet from a queue of data packets to be transmitted over a communications channel, modulating said first data packet using a first modulation scheme, selecting a second data packet from a queue of data packets to be transmitted over the communications channel, modulating the second data packet using a second modulation scheme overlaying the first data packet on a symbol by symbol basis, transmitting the first data packet overlaid with second data packet over the communications channel, determining whether the first data packet was received by monitoring using the first modulation scheme for an acknowledgment for the first data packet before expiration of a timeout period, determining whether the second data packet was received by monitoring using the first modulation scheme for an acknowledgment for the second data packet before expiration of the timeout period and repeating the steps outlined above, if acknowledgments were received for both the first and the second data packets. A system is presented for increasing data throughput in a communications channel comprising means for implementing the process outlined above.

32 Claims, 4 Drawing Sheets

METHOD AND SYSTEM FOR INCREASING DATA THROUGHPUT IN COMMUNICATIONS CHANNELS ON AN OPPORTUNISTIC BASIS

FIELD OF INVENTION

The invention relates broadly to the field of telecommunications and particularly to a method and system for increasing data throughput in communications channels, subject to fading and other non-Additive White Gaussian Noise (AWGN) impairments, on an opportunistic basis.

BACKGROUND OF THE INVENTION

Many communications standards are unable to effectively use the entire potential throughput of the channel specified in the standard due to the time-varying nature of that channel. To provide a reliable level of information flow, the data encoding and modulation is chosen to be relatively conservative. That is, even during a "bad" interval, information can still be effectively passed/communicated. However, it is often the case that the channel is much better than the pessimistic assumption, and more data could be reliably passed given knowledge about the quality of the channel.

Current communications standards are capable of adapting to channel variations, but only crudely. The most common approaches require the transmitter and receiver to make measurements, analyze the data, agree to change the modulation/coding used, and finally to synchronize the change. This is often a slow process that is ineffective in dealing with rapidly changing channel environments.

SUMMARY OF THE INVENTION

There is a great deal of interest in moving as much data as possible through a given channel or link. The more data that can be communicated through an existing given channel or link that already exists the longer the deployment of additional infrastructure can be postponed. If that increased throughput can be accomplished while maintaining backward compatibility, then customers need not replace or upgrade their equipment until they need the increased data rate. Further, a scheme for improving throughput according o the present invention can be used as a service differentiator for customers allowing for increased fees for customers electing to use services based on the method and system presented herein.

"A Method and Apparatus for Enhanced Communication Capability While Maintaining Standard Channel Modulation Compatibility" (U.S. Pat. No. 5,987,068, by Cassia et al., hereinafter "Cassia") assigned to Motorola discloses a radio communication system for providing an enhanced communication that combines a first information signal generated "from data according to a predefined standard modulation scheme" and a second information signal generated "from data that provides supplemental information to the standard modulated data" (emphasis added).

In contrast, the method of the present invention is used in a packet data communications system and further does not combine the two information signals in a multiplexing sense but rather overlays two packets. Furthermore, the second modulation scheme carrying data in the present system does not carry "supplemental information" but rather carries packets which if unacknowledged must be retransmitted. "Supplemental information" would include "supplementary or extra data, that although not necessary for normal communication operations, provide enhancement to the information supplied by the standard data".

Consequently, the novel concept presented here is the introduction of additional modulation on top of the primary modulation ("fractal" modulation) to increase data throughput on an opportunistic basis. It is important to note that while two modulation schemes are used, the signals are not combined or multiplexed but rather a second data packet modulated using a second modulation scheme is overlayed over a first packet for transmission over a communications channel. Also, the secondary signal is not supplemental but rather a second data packet with live data. The purpose, therefore, of the present invention is to increase data throughput rather to than to enhance communications with supplemental information.

It is an object of the present invention to increase data throughput over a communications channel or link on an opportunistic basis.

It is a further object of the present invention to increase data throughput over a channel or link by overlaying an additional (secondary) modulation on top of a primary modulation scheme.

A further object of the present invention is to allow existing systems to maintain backwards compatibility to existing standards.

It is yet another object of the present invention to allow the use of existing devices to be used transparently in systems with the enhancement presented herein.

BRIEF DESCRIPTION OF THE DRAWINGS

The invention is best described with reference to the detailed description and the following figures, where.

DETAILED DESCRIPTION OF THE PREFERRED EMBODIMENTS

In a preferred embodiment, the invention is directed to a packet communication system, including wireless, cable, or wired packet communication systems. The basic idea trades off a certain amount of signal-to-noise tolerance in the primary modulation scheme to incorporate the secondary modulation scheme with the expectation that the information in a second data packet can be reliably received often enough to make it worthwhile. As long as the transmitter has a queue of information packets to be sent, it always places information in a second data packet modulated using a secondary modulation scheme as well as in a first (primary) data packet modulated using the primary modulation scheme. If the receiver is only able to correctly decode data in the primary data packet, then only that packet gets acknowledged. However, if the second data packet can also be decoded correctly, then that packet is also acknowledged back to the transmitter. To ensure reliable transfer, all acknowledgments are modulated using the primary modulation scheme. Lack of an acknowledgment before the expiration of a timeout period acts an implicit negative acknowledgment.

A possible dataflow sequence follows:

| Transmitter | | Receiver | | |
|---|---|---|---|---|
| Primary Modulation | Secondary Modulation | Direction of Flow | Primary Modulation | Secondary Modulation |
| Packet 1 | Packet 2 | ⇒ | Packet 1 | Error |
| ACK 1 | (NACK 2) | ⇐ | ACK 1 | |
| Packet 2 | Packet 3 | ⇒ | Packet 2 | Packet 3 |
| ACK 2 | ACK 3 | ⇐ | ACK 2 | ACK 3 |

In the above example, the transmitter takes a first packet (Packet 1) from a queue of packets to transmit using a primary modulation scheme. A second packet (Packet 2) is then taken from the queue to transmit using a secondary modulation scheme overlaid over the primary modulation scheme. The receiver accurately receives the first packet (Packet 1) only. There is an error or errors and the second packet (Packet 2) is not correctly received. The quality of the channel or link is not sufficient to carry the additional data. The receiver acknowledges (ACK 1) to the transmitter and fails to acknowledge the second packet (Packet 2). The transmitter upon receipt of the acknowledgment for the first packet (Packet 1) and lack of acknowledgment before the expiration of a timeout period of the second packet (Packet 2) retransmits the second packet (Packet 2) using the primary modulation scheme and takes a third packet (Packet 3) from the queue for transmission using the secondary modulation scheme overlaid over the primary modulation scheme. The quality of the channel or link has changed and both the second and third packets (Packets 2 and 3) have been correctly received. The receiver then acknowledges the second packet (Packet 2) and the third packet (Packet 3) using ACK 2 and ACK 3 respectively. In all cases the acknowledgments are transmitted using the primary modulation scheme.

Figure 1:
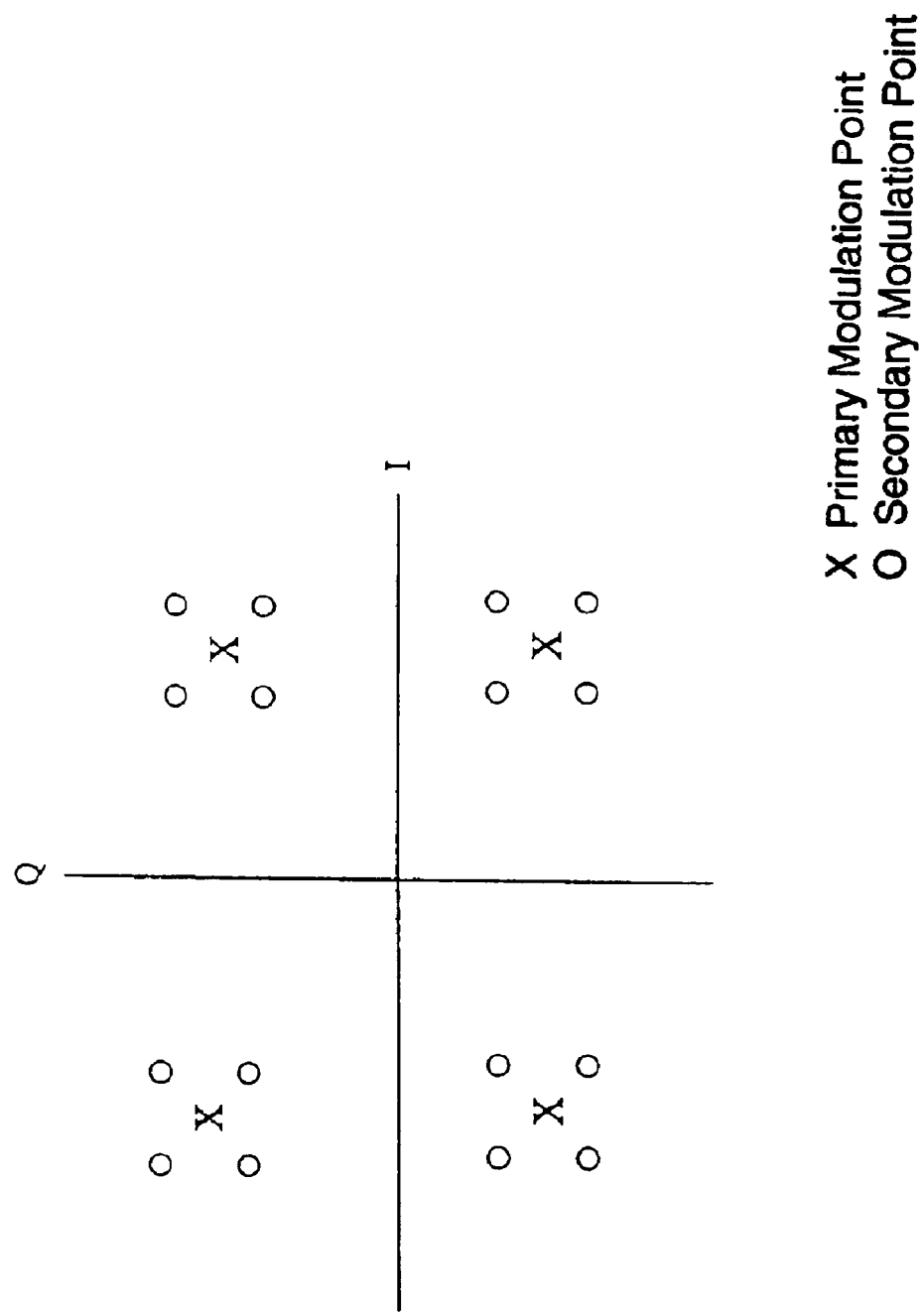
FIG. 1 depicts an example of fractal modulation applied to QPSK.

One possible embodiment of such a fractal modulation scheme applied to Quadrature Phase Shift Keying (QPSK) is reflected in FIG. 1. In FIG. 1, a QPSK with QPSK underlay is used. In this exemplary embodiment, the distance between a primary constellation point and the axis is approximately 4 and the distance between a secondary constellation point and its axis (where the primary constellation point at the center of the secondary constellation represents the origin of the axis of the secondary constellation points) is approximately 0.97. By limiting the amplitude of the secondary modulation, data throughput on the primary channel can be made nearly equivalent to that of standard QPSK (assuming block error correction).

The secondary modulation scheme is overlaid over the primary modulation scheme in the following manner. A first data packet is taken from a queue of data packets to be transmitted and modulated according to a first (primary) modulation scheme. A second data is taken from the queue of data packets to be transmitted. The first symbol of the first data packet is inspected to determine which point of the constellation of the primary modulation scheme it is. For example, it could be in the fourth quadrant. The first symbol of the second data packet is then inspected to determine which point in the constellation of the secondary modulation scheme it is. For clarity, calling the secondary constellation sub-quadrants, for example, the first symbol of the second packet might be in the third sub-quadrant of the secondary constellation. The symbols are now encoded as the third sub-quadrant of the fourth quadrant. This is done for each symbol of each pair of data packets to be overlaid. The overlaid packet is then transmitted over a communications channel. At the receiver, if the receiver is capable of decoding using the overlay scheme and the communications channel is of sufficient quality then the decoding process proceeds. If the receiver is not capable of decoding using the overlay scheme or the channel quality was not sufficient to properly decode the overlay, then it appears to the receiver that a symbol in the fourth quadrant was sent but that it was slightly noisy due to channel quality.

When the channel is good, the secondary modulation can also be decoded, significantly increasing data throughput. What this means is that the secondary payload is encoded and transmitted and a receiver capable of decoding the secondary payload decodes it correctly assuming that the channel is of sufficient quality. However, to a receiver not capable of receiving and decoding the secondary payload, it merely appears to be a primary payload with some noise. This method presented herein has a very desirable aspect in that it maintains backwards compatibility to existing standards. This is beneficial in two ways. First, it allows existing devices to be used transparently in systems with the enhancement. Users may upgrade as their needs demand. Second, this type of modulation scheme may be used to provide a proprietary service differentiation for customers (if you use our system and our terminals, you get a faster data connection).

Use of QPSK modulation is an exemplary embodiment only and not limited in any sense. Any currently defined digital modulation scheme could be used with the same or similar benefits accruing to the use of a secondary modulation scheme overlaid over a primary modulation scheme, for example Quadrature Amplitude Modulation (QAM). The primary or first modulation scheme need not be identical with the second modulation scheme. It is, however, to be remembered that the secondary modulation scheme should be more error-tolerant than the first modulation scheme. For example, it would be reasonable to use QAM as the first modulation scheme with QPSK as the second modulation scheme.

Simulation of this QPSK example in a Rayleigh environment suggests that 25% to 50% more data can be passed by adding the secondary modulation. In a sample embodiment, a primary payload (data transmitted on a first or primary path) of 184 bits is assumed. A secondary payload of 116 bits is assumed. Some coding scheme is needed for error protection. The coding scheme for the secondary payload needs to be greater than that used for the primary payload accounting for a slightly diminished secondary payload. Assuming the use of Reed-Solomon coding (as an example) and further assuming an attenuation of 3 dB, it can be shown that the probability of error in the primary payload is approximately $8.756*10^{-3}$ and that the probability of error in the secondary payload is approximately $4.281*10^{-1}$. That is, there is a greater probability of error in the secondary payload. The probability of an attenuation of between 3.5 dB and 2.5 dB is approximately 12%. Further, it can be shown that at a 1 dB gain, there is a probability of error in the primary payload of approximately $1.175*10^{-9}$ and a probability of error in the secondary payload of approximately $4.653*10^{-2}$. The probability of a gain between 0.5 dB and 1.5 dB is approximately 16%. Similarly, it can be shown that for a 4 dB gain that the probability of error for the primary payload approaches 0 and that the probability of error for the secondary payload is approximately $7.138*10^{-5}$. The probability of a gain between 3.5 dB and 4.5 dB is approximately 6%.

Figure 2:
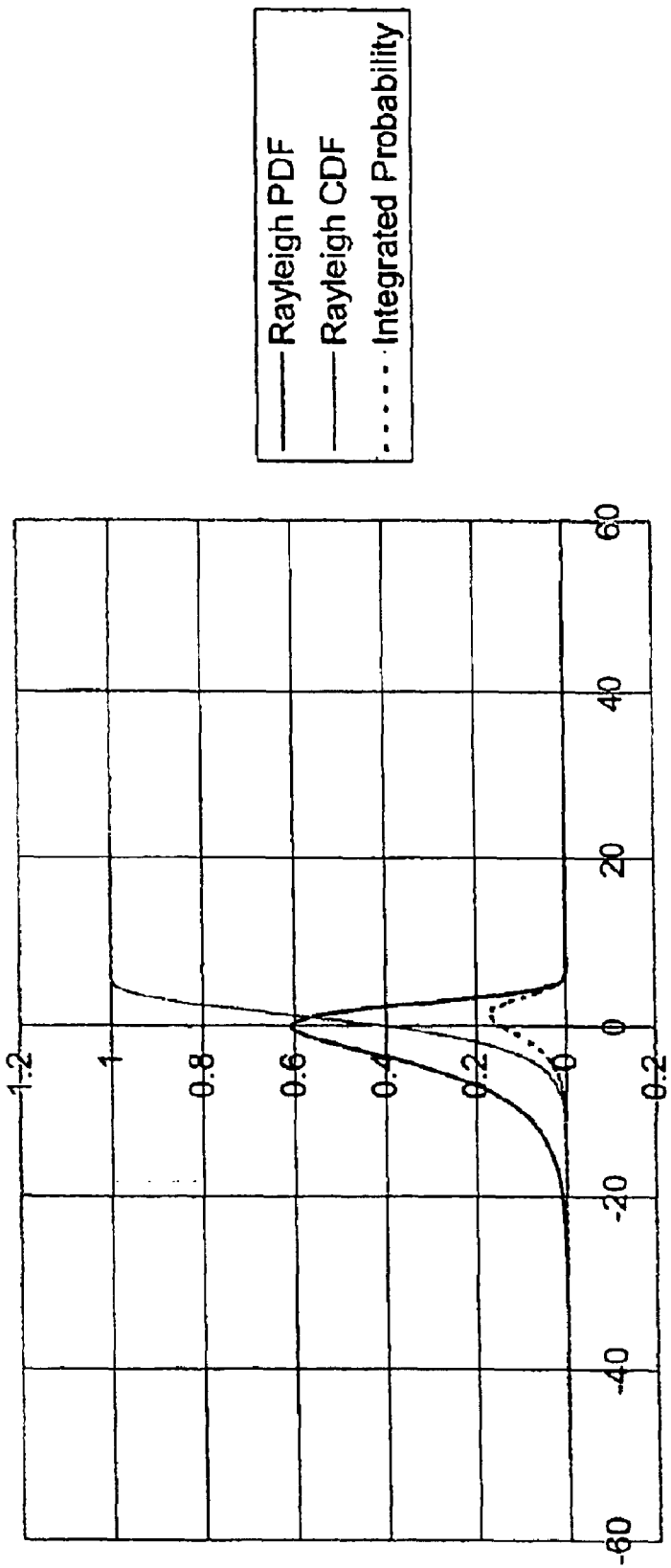
FIG. 2 depicts Rayleigh distribution.

FIG. 2 depicts a Rayleigh distribution. The distribution illustrates the probability of channel attenuation. Note that the probability of channel loss between −60 dB and −20 dB approaches 0 as does the probability of channel gain greater than 10 dB. The lowest line on the graph represents an integrated probability. This integrated probability represents the chance that the Rayleigh distribution will fall between a window ranging from −0.5 dB to +0.5 dB from a given 1 dB step over the range of −50 dB attenuation to +50 dB gain. The sum of these values is very nearly 1.0 since the Rayleigh distribution is most significant over the range of −20 dB to +6 dB. The middle line represents the probability density function for the Rayleigh distribution. The highest or topmost line represents the cumulative density function for the Rayleigh distribution, which is the integral of the probability density function. The Rayleigh cumulative density function shows that the integral of the Rayleigh density function is 1 at approximately 9 dB gain.

Figure 3:
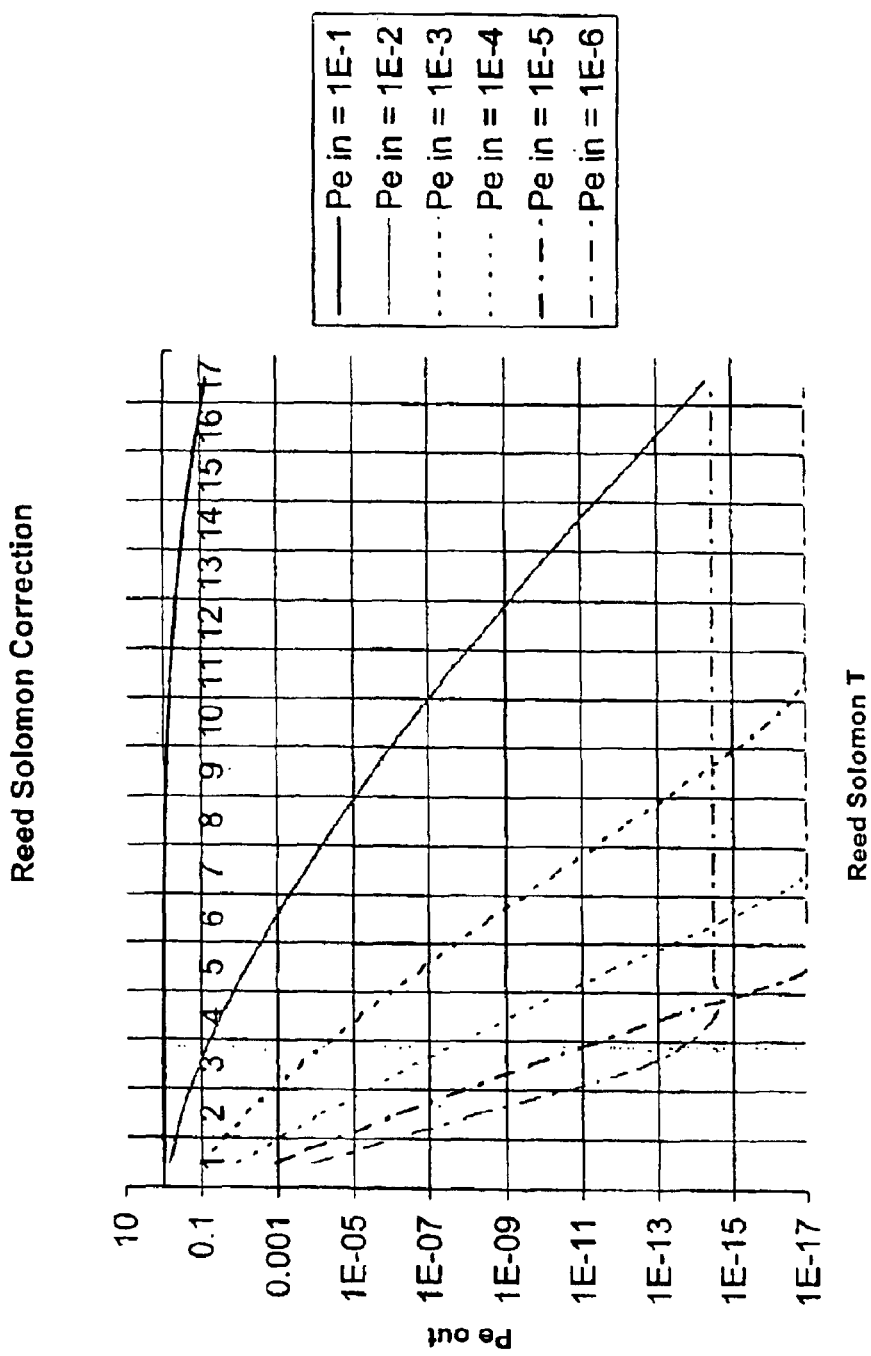
FIG. 3 depicts the use of Reed-Solomon correction.

FIG. 3 depicts Reed-Solomon correction applied to the secondary payload. There are six lines on the graph. The line to the farthest left depicts a probability of $1*10^{-6}$. That is, adding sufficient error coding so that the probability of error is less than $1*10^{-6}$. Bearing in mind that the better the channel, the less error coding will be necessary and the greater the error protection required, the more complex the decoding circuitry will be required. The lines progressing to the right and ending with the topmost line depict progressively less error protection or coding. Less error protection (coding) translates to increased probability of error in the reception of the secondary payload. The topmost line represents a probability of error of $1*10^{-1}$ (10% probability of error). To use this graph, assume that it is desirable to have a probability of error at the output of $1*10^{-6}$, this can be accomplished with additional coding of Reed-Solomon T=2 through 6. That is, the addition of error protection on the input side such that the probability of error is between $1*10^{-2}$ and $1*10^{-6}$. The fourth line from the left (Reed-Solomon T=3) performs acceptably with minimal increase in complexity.

Figure 4:
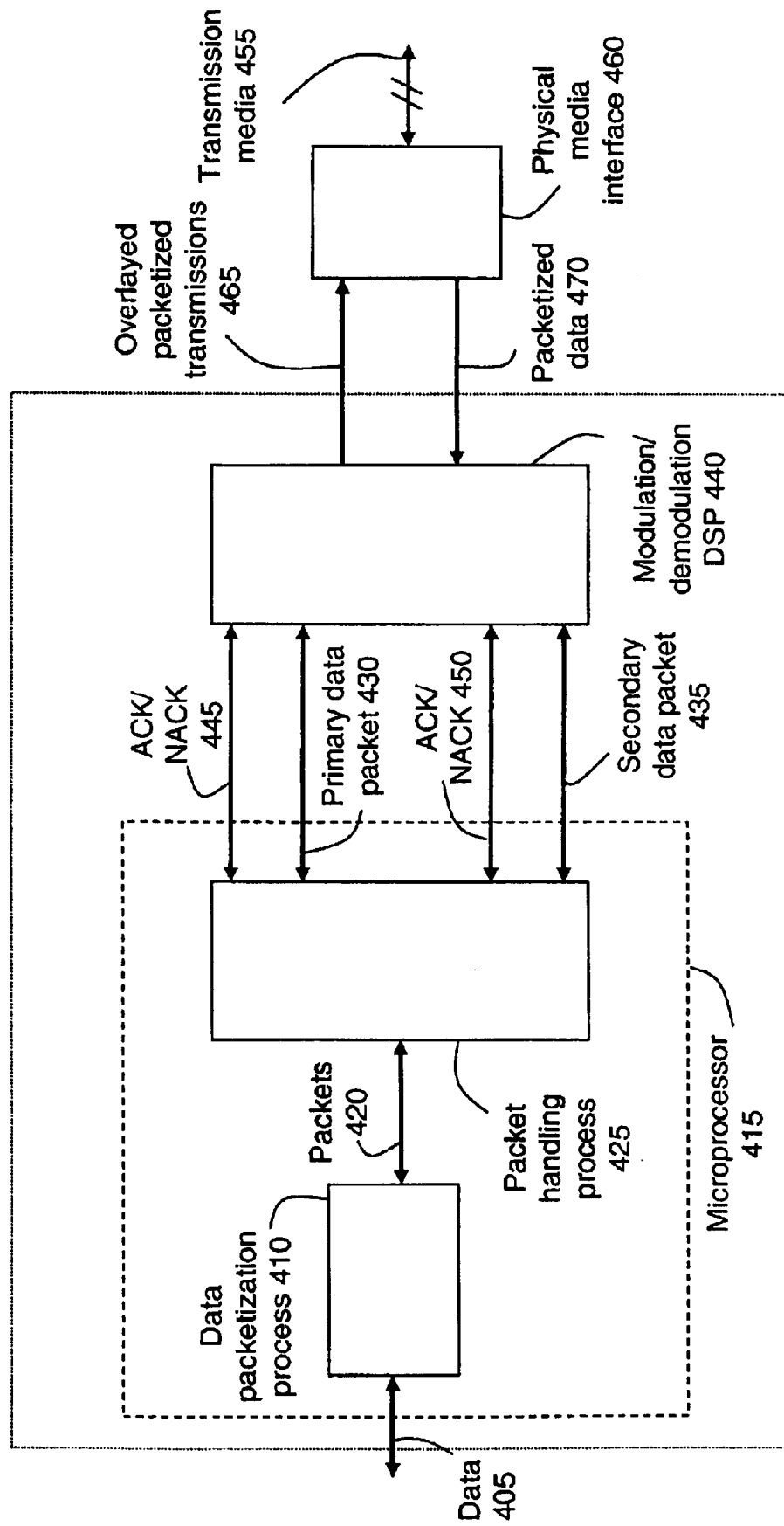
FIG. 4 is a block diagram of an exemplary implementation for a fractal modulation/demodulation system.

FIG. 4 is a block diagram of an exemplary implementation. Data 405 to be sent to the remote device is received by a local microprocessor. The data packetization process 410 running on the microprocessor 415 accumulates enough data to generate at least two packets 420 for transmission to the remote device. One of these packets is formatted for transmission on the primary channel, and another for the secondary channel. These packets are then forwarded to the packet handling process 425, which keeps track of which packets have been sent and which have been successfully received by the remote device. The packets (a primary data packet 430 and a secondary data packet 435) are passed to the modulation/demodulation DSP 440, where the bits in the packets are converted using a primary (first) and a secondary modulation scheme, overlayed and placed on the transmission media 455 (i.e. converted to an analog waveform and sent as a wired or wireless signal). Overlayed packetized transmissions 465 to a physical media interface 460 and incoming packetized data 470 are indicated on the block diagram.

The remote device receives the data and responds with an ACK 445 (for primary ACK) and 450 (for secondary ACK) if received correctly, a NACK 445 (for primary NACK) and 450 (for secondary NACK) if received incorrectly or a NACK is assumed if no ACK is received within a timeout period, or no response at all (if the remote device has no capability to process the secondary modulation). All ACKs and NACKs are transmitted over a primary (first) channel using a primary (first) modulation scheme. These responses are received and decoded by the modulation/demodulation DSP, and are passed to the protocol handling process in the microprocessor. Based on the response received (or lack of response), the protocol handling process determines whether the packet transmitted was successfully received. If the packet was not successfully received, the unsuccessful packet is retransmitted using the primary modulation scheme. Data transmission continues until all packets have been successfully transferred to the remote device.

Bidirectional communication is made possible when both the local and remote devices are equipped as shown.

The present invention may be implemented in hardware, software or firmware as well as Application Specific Integrated Circuits (ASICs), Reduced Instruction Set Computer (RISC) processors or Field Programmable Gate Arrays (FPGAs) or any other means by which the functions and process disclosed herein can be effectively and efficiently accomplished or any combination thereof. The above means for implementation should not be taken to be exhaustive but merely exemplary and therefore, not limit the means by which the present invention may be practiced.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

What is claimed is:

1. A method for increasing data throughput in a communications channel comprising the steps of:
   selecting a first data packet from a queue of data packets to be transmitted over said communications channel;
   modulating said first data packet using a first modulation scheme;
   selecting a second data packet from a queue of data packets to be transmitted over said communications channel;
   modulating said second data packet using a second modulation scheme overlaying said first data packet;
   transmitting said first data packet overlaid with said second data packet over said communications channel;
   determining whether said first data packet was received by monitoring using said first modulation scheme for an acknowledgment for said first data packet before expiration of a timeout period;
   determining whether said second data packet was received by monitoring said first modulation scheme for an acknowledgment for said second data packet before expiration of said timeout period; and
   repeating all of the the steps outlined above, if acknowledgments were received for both said first and said second data packets.

2. The method according to claim 1, wherein said overlaying of said second data packet on said first data packet is performed on a symbol-by symbol basis.

3. The method according to claim 1, wherein said communications channel is subject to fading.

4. The method according to claim 1, wherein said communications channel is subject to non-AWGN impairments.

5. The method according to claim 1, wherein said second modulation scheme is amplitude limited.

6. The method according to claim 1, wherein both said first and said second modulation schemes use QAM.

7. The method according to claim 1, wherein both said first and said second modulation schemes use QPSK.

8. The method according to claim 1, wherein said first and said second modulation schemes are different from each other.

9. A method for for increasing data throughput in a communications channel comprising the steps of:
- selecting a first data packet from a queue of data packets to be transmitted over said communications channel;
- modulating said first data packet using a first modulation scheme;
- selecting a second data packet from a queue of data packets to be transmitted over said communications channel;
- modulating said second data packet using a second modulation scheme overlaying said first data packet;
- transmitting said first data packet overliad with said second data packet over said communications channel;
- determining whether said first data packet was received by monitoring using said first modulation scheme for an acknowledgment for said first data packet before expiration of a timeout period;
- determining whether said second data packet was received by monitoring using said first modulation scheme for an acknowledgment for said second data packet before expiration of said timeout period; and
- using said second data packet as the selected first packet and repeating the steps outlined above commencing with said modulating step for said first data packet, if no acknowledgment was received for said second data packet prior to expiration of said timeout period.

10. The method according to claim 9, wherein said overlaying of said second data packet on said first data packet is performed on a symbol-by symbol basis.

11. The method according to claim 9, wherein said communications channel is subject to fading.

12. The method according to claim 9, wherein said communications channel is subject to non-AWGN impairments.

13. The method according to claim 9, wherein said second modulation scheme is amplitude limited.

14. The method according to claim 9, wherein both said first and said second modulation schemes use QAM.

15. The method according to claim 7, wherein both said first and said second modulation schemes use QPSK.

16. The method according to claim 9, wherein said first and said second modulation schemes are different from each other.

17. A system for increasing data throughput in a communications channel comprising:
- means for selecting a first data packet from a queue of data packets to be transmitted over said communications channel;
- means for modulating said first data packet using a first modulation scheme;
- means for selecting a second data packet from a queue of data packets to be transmitted over said communications channel;
- means for modulating said second data packet using a second modulation scheme overlaying said first data packet;
- means for transmitting said first data packet overlaid with said second data packet over said communications channel;
- means for determining whether said first data packet was received by monitoring using said first modulation scheme for an acknowledgment for said first data packet before expiration of a timeout period;
- means for determining whether said second data packet was received by monitoring using said first modulation scheme for an acknowledgment for said second data packet before expiration of said timeout period; and
- means for performing an iterative loop encompassing the system above, if acknowledgments were received for both said first and said second data packets.

18. The method according to claim 17, wherein said overlaying of said second data packet on said first data packet is performed on a symbol-by symbol basis.

19. The system according to claim 17, wherein said communications channel is subject to fading.

20. The method according to claim 17, wherein said communications channel is subject to non-AWGN impairments.

21. The system according to claim 17, wherein said second modulation scheme is amplitude limited.

22. The method according to claim 17, wherein both said first and said second modulation schemes use QAM.

23. The system according to claim 17, wherein both said first and said second modulation schemes use QPSK.

24. The system according to claim 17, wherein said first and said second modulation schemes are different from each other.

25. A system for increasing data throughput in a communications channel comprising the steps of:
- means for selecting a first data packet from a queue of data packets to be transmitted over said communications channel;
- means for modulating said first data packet using a first modulation scheme;
- means for selecting a second data packet from a queue of data packets to be transmitted over said communications channel;
- means for modulating said second data packet using a second modulation scheme overlaying said first data packet;
- means for transmitting said first data packet overlaid with second data packet over said communications channel;
- means for determining whether said first data packet was received by monitoring using said first modulation scheme for an acknowledgment for said first data packet before expiration of a timeout period;
- means for determining whether said second data packet was received by monitoring using said first modulation scheme for an acknowledgment for said second data packet before expiration of said timeout period;
- means for using said second data packet as the selected first packet; and
- means for performing an iterative loop of a portion of the system outlined above commencing with said means for modulating said first data packet, if no acknowledgment was received for said second data packet prior to expiration of said timeout period.

26. The method according to claim 25, wherein said overlaying of said second data packet on said first data packet is performed on a symbol-by symbol basis.

27. The system according to claim 25, wherin said communications channel is subject to fading.

28. The system according to claim 25, wherein said communications channel is subject to non-AWGN impairments.

29. The system according to claim 25, wherein said second modulation scheme is amplitude limited.

30. The method according to claim 25, wherein both said first and said second modulation schemes use QAM.

31. The system according to claim 25, wherein both said first and said second modulation schemes use QPSK.

32. The system according to claim 25, wherein said first and said second modulation schemes are different from each other.

* * * * *